Aug. 26, 1941. P. H. WALSH ET AL Re. 21,890

INDUSTRIAL AND PAPERMAKERS'. FELTS

Original Filed May 4, 1937 2 Sheets-Sheet 1

Inventors
Patrick H. Walsh
Percival T. Gates
by James R. Hodder
Attorney

INDUSTRIAL AND PAPERMAKERS' FELTS

Original Filed May 4, 1937 2 Sheets-Sheet 2

Inventors
Patrick H. Walsh
Percival T. Gates
by James R. Hodder
Attorney

Reissued Aug. 26, 1941

Re. 21,890

UNITED STATES PATENT OFFICE 21,890

INDUSTRIAL AND PAPERMAKERS' FELTS

Patrick H. Walsh, Boston, Mass., and Percival T. Gates, Montclair, N. J., assignors to Drycor Felt Company, Belleville, N. J., a corporation of New Jersey Original No. 2,165,772, dated July 11, 1939, Serial No. 140,652, May 4, 1937. Application for reissue January 2, 1940, Serial No. 312,689

3 Claims. (Cl. 28—4)

Our present invention is a novel and improved construction of needled fabrics and method of making same, and is directed particularly to improve and perfect felts for use in paper manufacture and industrial lines.

The usual known felts for use in paper manufacture consist of a woven fabric, usually wool, which is subjected to a fulling process to shrink and compact the fabric, and is then brushed or teazeled to produce a napped surface. Inasmuch as the woven material has to be selected with a view to providing the felt, as far as possible, with all of the required characteristics for paper making, such as pulp support, water-removal, and paper formation, as well as strength and wear resistance, certain of these factors are necessarily sacrificed to the attainment of others. We have discovered that a needled fabric, that is, a fabric consisting of a base fabric for instance woven material, into which wool fibres are incorporated by needling, provides a structure peculiarly suited to paper making, this material acquiring entirely new functions in such use, and having characteristics superior to the woven paper-making felts. For instance, the arrangement of the needled fibres in relation to the base structure, due to their positive directional positioning by the needles during insertion gives certain drainage effects entirely different from the drainage characteristics of the woven felt and the nap in which the fibre ends tend to become tucked in, has a smooth cushioned paper formation surface, which is entirely different both in structure and cooperative action with the paper pulp from the brushed or teazeled nap of such prior woven paper-making felts. The uses to which needled fabric has been put heretofore, such as for clothing, carpets, blankets, and the like, has in no case simultaneously brought into use or suggested the combination of functions and characteristics that such fabric assumes when incorporated as an element of a paper making machine.

In carrying out our invention we prefer to utilize the improved methods and machines for the manufacture of needled articles, such for example as illustrated in the prior U. S. Patents No. 1,620,307 dated March 8, 1929, No. 1,743,068, dated Jan 7, 1930, on Process of making textile fabrics; and No. 1,745,739, dated Feb. 14, 1930, and No. 1,853,861, dated April 12, 1932, on Needling apparatus, improving and modifying the fabric structure as will be hereinafter explained, and also building our improved article under suitable tension, all for the special purpose of producing an industrial felt and felts intended for paper-making machines.

The requirements for paper-makers' felts, for example, are extremely severe, the felt being in the form of a belt which will receive, transport, and remove water from the pulp material, permitting the water and moisture to drain from such pulp while being transported, and with a smooth finished surface which will tend to eliminate wrinkles, inequalities, or undesirable markings on the resultant paper product.

Furthermore, considerable difficulty has been experienced heretofore in providing a belt which will be wear-resistant to the extremely severe requirements where asbestos or cement shingles, or the like, are being formed, the filtering action quickly filling the usual felt material with the dirt, cement, or the like, carried off by the water as it filters thru the belt and filling up the same, as well as wearing the belt out on the suction boxes and rollers over which it has passed.

Thus it will be appreciated that extremely severe service is required from articles of this sort, from the one extreme of making soft, thin face tissues, such as cleansing tissue, paper towels, or the like, writing and bond paper, up to the heavier articles such as cement and asbestos shingles and the like industrial articles.

In carrying out our invention we practically eliminate the prior difficulties heretofore experienced, and have devised an extremely efficient, wear-resistant, and effective paper-makers' and industrial felt which will insure constant drainage, minimize filling and clogging of the felt, and insure easy cleaning of the same, thus maintaining the porosity of the felt in satisfactory condition during use, and which will also present a smooth, even surface for the layer of pulp and eliminate objectionable markings on the product.

It is a further feature of our present discovery to provide an extremely strong, wear-resistant structure with a special base fabric, preferably built under tension so as to permit tensioning of the belt in use without distorting the fabric and with special surfacing of the fabric, and all by the simple, efficient, and economical needling processes of said prior patents, and with great speed in operation.

Further improvements, novel combinations, and advantages will be hereinafter more fully pointed out and claimed, including our novel base fabric with ply strands for the warp, and cable twisted strands for the filling.

Referring to the drawings illustrating a preferred embodiment of our present invention, Fig. 1 illustrates in diagrammatic form a fragmentary step in the process of manufacturing our improved felts, showing a schematic method of needling the layers to the base fabric, or fabrics, under tension utilizing a needling machine of said prior Patent No. 1,745,739, or the like;

Our novel and improved felt structure is suitable for use with a wide range of material and capable of satisfactory manufacture with a plurality of fleece layers, preferably of wool, and with a plurality of degrees or grade of texture, as fine, coarse, thick, or mixed.

Thus we prefer to manufacture paper-makers' felts with, for example, an extremely heavy base fabric especially woven for needling under tension to withstand the weight, strain, and tension of substantially actual paper-making machine service, without undue distortion. When a heavy layer, such as shingle, mill, or gasket board are formed or built up on paper-machine felts, a very considerable strain is necessarily imparted to the fabric and, hence, such felts are distorted in service, as heretofore made.

By our method of needling under tension, and with a specially formed fabric, we particularly prepare the felt for such stress during use of same and thus eliminate distortion, thereby still further improving our product and insuring long life, wear-resistance, and efficient service.

We also contemplate the utilization of extremely heavy fabric with a needled layer of relatively coarse wool thereon to take the strain of the fabric adjacent the suction boxes and rolls over which the belt is conducted, while we also needle to the opposite surface one or more layers of wool which may be, first, a coarse layer, and then an extremely fine layer to thus give a more even, smooth, and uniform surface on which the pulp is carried. This is of still further advantage as the finer surface next to the pulp, while permitting free drainage of the same during the travel of the belt, will protect the rest of the belt against clogging as the lower and more open layers of coarser material will not be clogged or filled by any material which can escape thru the finer top surface.

A further advantage is that this finer top surface is more readily cleaned by the cleansing streams of water usually applied to the top surface of the felts once the pulp material is led free therefrom.

Thus it will be appreciated that we have devised a peculiarly beneficial structure for industrial and paper-makers' felts, and we shall now describe the same in detail.

Figure 4:
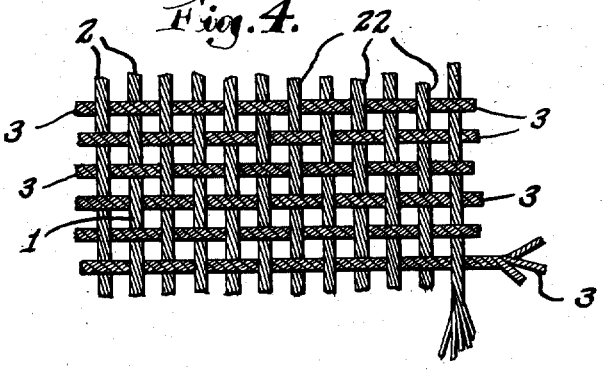
Fig. 4 is a fragmentary cross-sectional view illustrating a preferred form of base fabric as woven for our particular industrial felt construction and for needling under tension.

Referring to Fig. 4, a preferred form of base fabric 1 is illustrated wherein the warp strands 2, 2, 2 are shown running vertically in the drawings and lengthwise of the fabric and are formed of ply yarns; whereas the filling or woof strands 3, 3, 3 are formed of cabled or twisted strands. We have discovered that this construction insures a minimum of stretch lengthwise of the fabric where the greatest tension is exerted and, thus, results in the least distortion of the felt during the severest service to which it is subjected. A stranded warp structure has less capacity for lengthwise stretch than the cabled structure, such as shown at 3, since the twisting of the cables gives greater length of material to this form of structure and, hence, greater capacity for stretch. Consequently, we prefer to form our base fabric with stranded warp and the twisted or cabled filling layers. This fabric may be woven with large or small interstices, the same being somewhat overdrawn with enlarged openings in Fig. 4.

Figure 5:
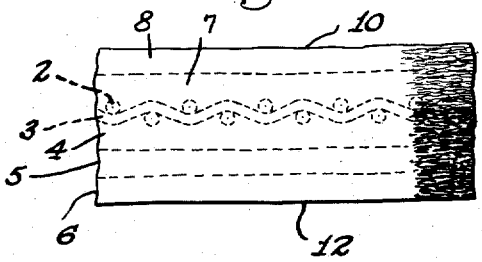
Fig. 5 is a fragmentary view of our improved felt with a plurality of layers needled to a single base fabric.
Figure 6:
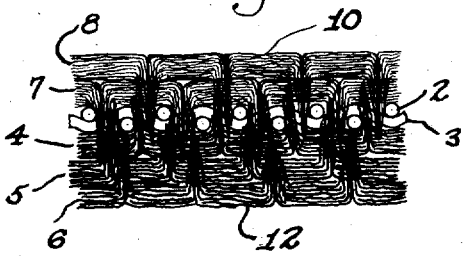
Fig. 6 illustrates the same in detail and cross-sectional structure so far as possible.

The base fabric 1 may also be of any size and diameter of warp and woof strands and, thus, of varying strength, As shown in Figs. 5 and 6, our paper-makers' felt in this form comprises a single base fabric 1 with the stranded warps or plies 2 lengthwise, and with a plurality, as herein shown three layers or fleeces, of wool 4, 5, and 6 needled to the under surface, with two layers 7 and 8 needled to the upper surface, this needling operation being effected successfully with a single layer being layered at a time, as shown and explained in said prior patents, and the layers alternately needled to one side and then to the other.

Preferably and as herein shown the lower layers which are to contact with and withstand the wear of the rollers over which the felt passes have the layers 4, 5, and 6 of coarse, strong, wear-resisting wool while the upper layers 7 and 8 are of much finer wool material, thus giving a smooth top surface 10 to the belt on which the pulp will rest, with a relatively coarse wear-resisting surface 12 to contact with the rollers.

Figure 7:
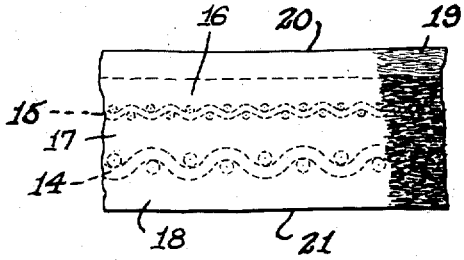
Fig. 7 is a corresponding fragmentary side view of a plurality of base fabrics of different strength, diameters, and counts, wherein a plurality of different fleeces are needled thereto.
Figure 8:
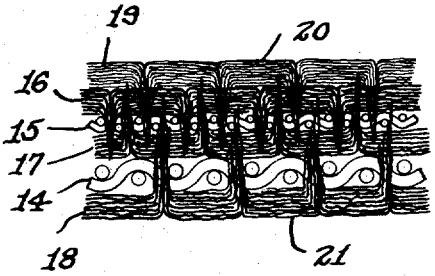
Fig. 8 shows the same in cross-sectional structure.

In Figs. 7 and 8, we have illustrated a plurality of base fabrics, the same also being of differing sizes of warp and woof threads. In this form the lower base fabric 14 is of the stronger heavier type, and the second base fabric 15 is of a finer closer woven grade, with the needled layers 16, 17, and 18 being of relatively coarse wool and the topmost layer 19 being of fine wool to give a smooth pulp-receiving surface 20, while the opposite surface 21 is coarse and wear-resistant, being that contacting with the rollers. This particular structure is found to give unusual pliability and wear as well as excellent filtering qualities.

Figure 3:
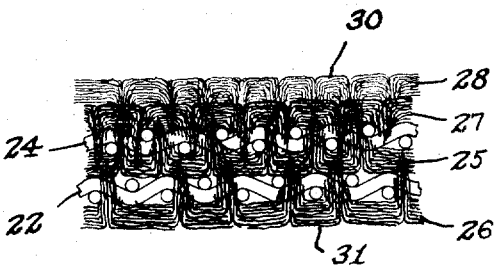
Fig. 3 is a fragmentary cross-sectional view illustrating our improved fabric with a plurality of base members and a plurality of needled layers of different strength and texture.

In Fig. 3 we have illustrated a still further modification in which the two base fabric layers are of the same grade, strength, and size of material, these being indicated at 22 and 24, together with the needled layers of coarse wool 25, 26, and 27, and a top finishing layer of fine wool 28 to give a smooth pulp-receiving surface 30 on the top and a strong wear-resistant surface 31 on the bottom or inside of the belt where it goes over the rolls.

These layers are individually needled to the base fabric. We needle to the base fabric 24 the fleece layer 25 on one side, and the fleece 27 on the opposite side, and thereafter apply the second base fabric 22 and needle the fleece 26 thru said base fabric 22 to the previously needled layers and finally needle the layer 28 as a finishing surface thru the fleece 27, as shown in Fig. 3. This sequence may be varied, if desired, but the above are found to be advantageous and feasible.

Figure 1:
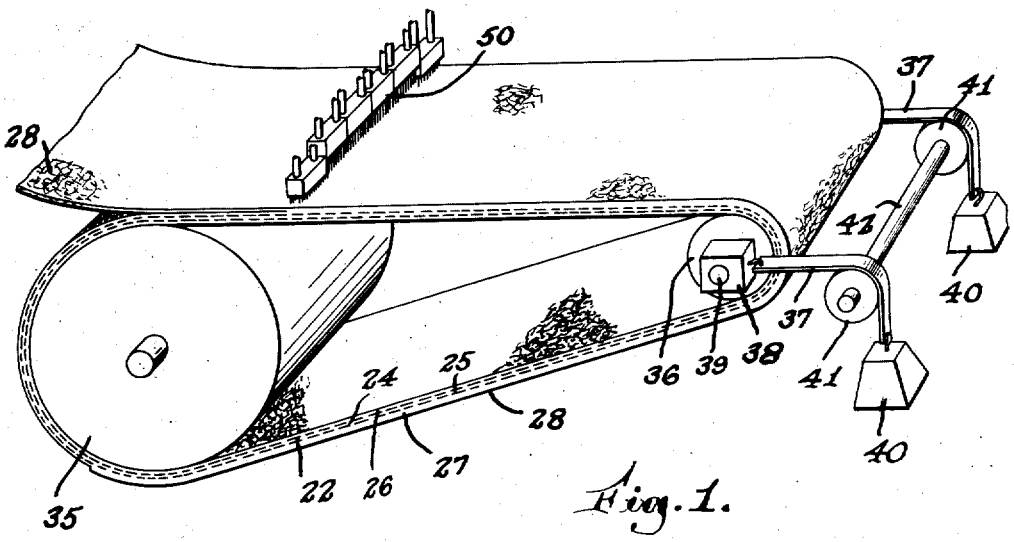

Referring to the diagrammatic showing in Fig. 1, we illustrate a needling operation as applied under lengthwise tension, this diagram being shown merely for illustrative purposes.

A suitable roller 35 is shown over which the base material herein illustrated is that of Fig. 3. with the two layers 22 and 24 of base fabric, wherein the coarse layers 25, 26, and 27 have already been needled and the fourth or finishing fine layer 28 is being applied. A forward roll 36 is held under tension in any suitable manner, as for example by straps 37—37 attached to movable bearing blocks 38, carrying the axle for a shaft 39 on which the roller 36 runs, which is held under tension against the belt by weights 40—40 attached to each end of said straps and going over idle rolls 41—41 suitably mounted on a shaft 42, as shown, or in any other suitable manner.

The needle bar indicated as in Fig. 1 and designated at 50 comprises a plurality of movable needle-carrying members adapted to move in timed relation with the feed of the belt during the needling operation, as explained and shown in said prior patents.

Figure 2:
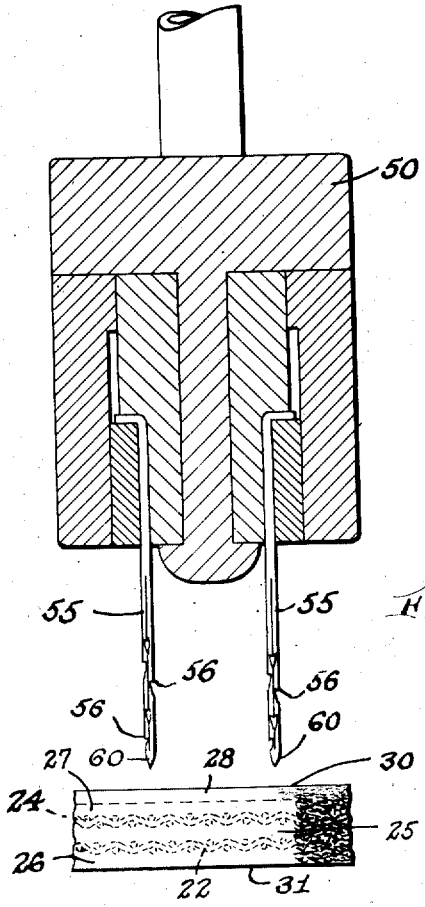
Fig. 2 is an enlarged cross-sectional view illustrating a special type of needle which we have devised, and, preferably, employ during the needling operation.

We have illustrated in enlarged view in Fig. 2 the needle holding bar 50 of a standard construction, as shown in said machine patents, wherein the needle with the barbs 56—56 thereon point downwardly to engage and drive the layer of wool being needled into the fabric.

After the needling operation is completed it is customary and desirable to trim, singe, or shear the surface layer, viz., layer 10 of Fig. 5, also 20 of Fig. 7, or 30 of Fig. 3, and thereupon the now completed article is ready for use.

Our improved structure is practically non-stretching in service, more easily kept clean by reason of the coarser fabric or layers in the underneath part, and in addition the structure has an absorbing or blotting effect aiding in removing the water and moisture from the pulp as it is carried on the belt, not possible with other or prior articles.

The use of the needled fabric felt according to our invention on cylinder machines results in an improved quality of paper, the paper made thereon having a different and improved physical formation evidenced by higher Mullen (pop) test, tare test, and bulking test. This is due to a combination of three factors: (1) The needled fabric felt has measurably less elasticity than woven felts, resulting in less stretch and in consequence a decreased distortion of the formation of the web of paper it carries; (2) owing to its "closeness" it does not permit the passage of as high a percentage of fines and color thru it with the water, resulting in this material being retained in the sheet of paper itself; and (3) owing to its greater cushion effect, a wider range of weights can be used at the presses on the paper machine thus controlling the desired formation of a wider range of possibilities. There is a corrolary to the decreased stretch factor. Owing to the fact that the felt does not stretch as much as prior woven felts it does not narrow up as much under tension and hence, delivers a wider sheet of paper to the driers.

Felt, according to the invention, makes paper with a less pronounced felt mark and a more uniform finish. This appears to be the result of three factors: (1) cotton, or other selected material of which the base cloth may be woven, being stronger than wool it is possible to obtain the necessary tensile strength with a warp and fill of smaller calibre (count for count); (2) the resulting smaller size of the knuckles in our base cloth makes for a more even rate of drainage in the area described as the interstices and the knuckles, respectively; (3) the fact that we add our wool nap to an already woven base cloth of smaller calibre yarns (count for count) permits the more effective cushioning of the warp and fill yarns. Fundamentally, the difference between the needled felt of the invention and woven felt in this respect lies in the fact that the woven felt has its nap teazeled out of its fill yarns, whereas in the needled felt of the invention the nap is added in the form of a pile to a prewoven basic structure.

The needled felt, according to the invention has a minimum of shrinkage resulting in the following advantages in paper machine operation: (A) The delivered dimensions are more approximately the actual operating dimensions. With this type of felt it is unnecessary to shrink the felt down to proper operating dimensions after the felt is on the paper machine. In the case of woven felts, which require such shrinkage, this is both a time consuming operation and also a very risky one in that too hasty or improper shrinkage can easily impair both the efficiency and life of the belt. (B) The fact that it is not necessary to shrink or "break in" the needled felt means that a paper machine can be brought up to its maximum speed of operation in a much shorter time. (C) The needled felts do not have as much stretch as woven felts thus requiring less constant attention on the part of the paper machine operator. (D) The needled felts require less frequent washing and do not show the same tendency to "fill up" which in certain operations is characteristic of woven felts. We believe this to be due to the closeness of our construction which does not permit the finer fibres to pass thru it with the water thus minimizing the chances of their being trapped enroute thru.

Needled felts, according to the invention are less susceptible to accidents characteristic of paper machine operation, this being due to their increased tensile strength, their greater inherent cushion, and their tendency in not to "travel" on the paper machine. Owing to the fact that the needled felt stays cleaner and has an inherent greater amount of cushion, the felt will pick up a heavier web of paper off a cylinder, thus permitting an increase in the tonnage produced per day.

In general, needled felts according to the invention will give longer life than woven felts do, due to the following factors: (1) the knuckles of the weave have better protection against the shaving action of abrasive wear; (2) they do not carry as much dirt in the felt which has a tendency to cut the woolen fibres of the woven felt; (3) owing to their advantage in water removal, it is unnecessary to use as high vacuum on them, resulting in less wear from being sucked down into the slots of vacuum boxes; (4) owing to their relative inelasticity they are not subject to the same fracture or fatigue factor as is the more elastic woolen yarns; (5) owing to the strong alkaline stock conditions prevalent in many mills, the needled felt is not weakened thru chemical deterioration as much as woolen felts, this being a particular advantage in times of slack business when mills are operating intermittently; and (6) again as a result of the felts tendency to stay clean longer, it is unnecessary to whip this felt as hard as woven felts must be whipped.

In comparing the needled felts of the invention with woven felts, the fact should be borne in mind that the fundamental job of a papermakers' felt of any type is to drive the paper machine, to pick up and convey the web of pulp, to remove water from it, to impart a minimum of felt mark, and to run for as long a period of time as possible. Any one and sometimes two of these requirements can be satisfied in the woven type of construction, substantially as well as in the case of the needled felt, but the important thing to bear in mind is that in order to emphasize finish, life, or water removal, it is necessary to sacrifice the other two qualities, whereas the needled felt of the invention permits advantage in all three factors simultaneously. For example, a woven felt of which a high finish is required can be built but at the expense of both water removal and life. A woven felt designed to give maximum water removal must sacrifice finish and life. A woven felt built for long life is constructed at the expense of drainage and finish. The felt of the invention does not sacrifice one or more qualities in order to emphasize the third, but effectually embodies all of them to an accurately controlled predetermined degree.

We claim:

1. As a new article of manufacture, papermakers' felts for use in papermaking machinery for supporting and draining paper-making material, comprising a base fabric consisting of ply strands forming the warp, with cable twisted strands constituting the filling, said ply strands being relatively less stretching than said cable twisted strands, a plurality of needled fleeces at the opposite surfaces of said base material, the top surface comprising a closely needled smooth fleece for carrying pulp material, and the bottom surface comprising a fleece of coarser form permitting drainage from the pulp material therethru free of clogging, and said coarser fleece constituting a wear-resisting surface for driving over pulleys.

2. An endless belt papermakers' felt for use in papermaking machinery for supporting and draining paper making pulp fibre material, comprising a woven fabric base in which the warp and weft strands have an open weave to provide drainage passages from the upper to the lower side, whereby the fibres of said strands remain substantially lengthwise of the strands for strength and said drainage passages are substantially free of loosely projecting fibres of said strands, and a paper formation nap cushion upon the upper side of said fabric base consisting of fibrous material, the individual fibres of which are disposed partially above the upper side of said base fabric in the form of a nap cushion and partially in the drainage passages, said last mentioned portions extending through said base fabric, whereby they are disposed in the direction of drainage through said base fabric and thus direct water through said drain passages while at the same time substantially filling them to retain the paper making fibres upon said paper formation nap cushion upper surface.

3. An endless belt papermakers' felt for use in papermaking machinery for supporting and draining paper making pulp fibre material, comprising a woven fabric base in which the warp and weft strands have an open weave to provide drainage passages from the upper to the lower side, whereby the fibres of said strands remain substantially lengthwise of the strands for strength and said drainage passages are substantially free of loosely projecting fibres of said strands, and a paper formation nap cushion upon the upper side of said fabric base and a wear resisting nap cushion upon the lower side, each of said nap cushions consisting of fibrous material, the individual fibres of which are disposed partially at the respective sides of said base fabric in the form of nap cushions and partially in the drainage passages, said last mentioned portions extending through said base fabric, whereby they are disposed in the direction of drainage through said base fabric and thus direct water through said drain passages while at the same time substantially filling them to retain the paper making fibres upon said paper formation nap cushion upper surface.

PATRICK H. WALSH.
PERCIVAL T. GATES.